(12) United States Patent
Aldy

(10) Patent No.: US 9,231,385 B2
(45) Date of Patent: Jan. 5, 2016

(54) METHOD AND TOOL FOR ADJUSTING CABLE GRIPS

(76) Inventor: William Aldy, Glen St. Mary, FL (US)

( * ) Notice: Subject to any disclaimer, the term of this patent is extended or adjusted under 35 U.S.C. 154(b) by 831 days.

(21) Appl. No.: 12/848,591

(22) Filed: Aug. 2, 2010

(65) Prior Publication Data

US 2012/0024119 A1    Feb. 2, 2012

(51) Int. Cl.
*H02G 1/08* (2006.01)
*H02G 1/00* (2006.01)

(52) U.S. Cl.
CPC ............. *H02G 1/00* (2013.01); *Y10T 29/49801* (2015.01)

(58) Field of Classification Search
USPC .......... 254/134.3 FT, 134.3 R, 284, 285, 286, 254/335, 336, 337, 396, 397, 398; 269/3, 6
See application file for complete search history.

(56) References Cited

U.S. PATENT DOCUMENTS

| | | | |
|---|---|---|---|
| 1,670,543 A | 5/1928 | Kellems | |
| 1,679,490 A * | 8/1928 | Parker | 254/134.3 FT |
| 1,735,563 A * | 11/1929 | Deckard | 29/447 |
| 1,886,026 A | 11/1932 | Kellems | |
| 2,664,609 A | 1/1954 | Kellems | |
| 3,605,251 A * | 9/1971 | Salerno et al. | 29/433 |
| 3,638,987 A * | 2/1972 | Fidrych | 294/86.42 |
| 4,558,751 A * | 12/1985 | Huffaker | 175/99 |
| 4,842,207 A * | 6/1989 | Kinnan | 242/390.9 |
| 4,923,134 A * | 5/1990 | Kinnan | 242/390.8 |
| 5,001,305 A * | 3/1991 | Bartholomew | 174/136 |
| 5,979,881 A * | 11/1999 | Kendall, Jr. | 254/134.4 |
| 6,256,852 B1 * | 7/2001 | Decker | 29/235 |
| 6,259,029 B1 * | 7/2001 | Hand | 174/74 R |
| 6,932,323 B2 * | 8/2005 | James | 254/134.4 |
| 6,992,253 B1 * | 1/2006 | Spellman et al. | 174/74 R |
| 8,322,692 B2 * | 12/2012 | Ebbenga | 254/278 |
| 2010/0051886 A1 * | 3/2010 | Cooke et al. | 254/134.3 R |
| 2011/0101290 A1 * | 5/2011 | Carlson et al. | 254/134.3 FT |

FOREIGN PATENT DOCUMENTS

| | | | | |
|---|---|---|---|---|
| GB | 2094255 A | * | 9/1982 | B65H 57/26 |
| JP | 01174210 A | * | 7/1989 | H02G 1/06 |

OTHER PUBLICATIONS

Translation JP01174210.*

* cited by examiner

*Primary Examiner* — Charles A Fox
*Assistant Examiner* — Joseph J Sadlon
(74) *Attorney, Agent, or Firm* — Beusse Wolter Sanks & Maire; Ferdinand M. Romano

(57) ABSTRACT

A tool for adjusting a grip. The tool includes a tubular section for containing the grip while receiving a cable. A first stop is positioned in or near a first end of the tubular section to provide an opening for introducing the cable into the tubular section while the grip is contained in the tool. One of first and second stops is arranged for displacement along the longitudinal axis with respect to the other stop. With the grip positioned between the first and second stops, when one of the stops is displaced toward the other stop a force is applied against the grip, causing the size of the bore to increase and the length of the grip to be contracted.

11 Claims, 7 Drawing Sheets

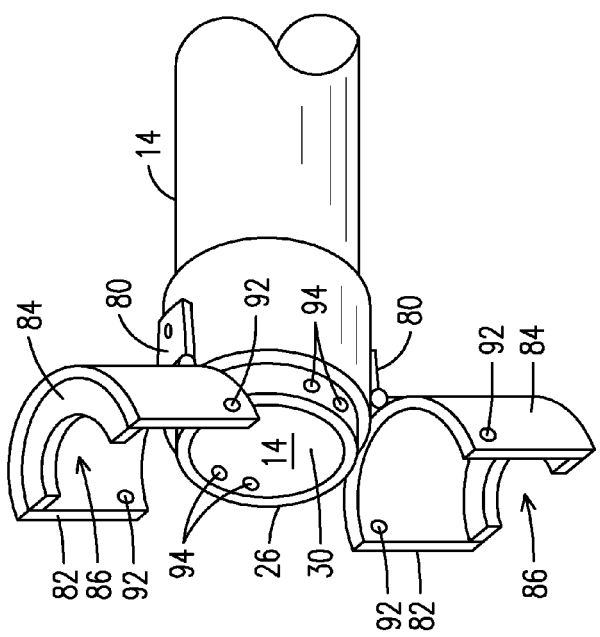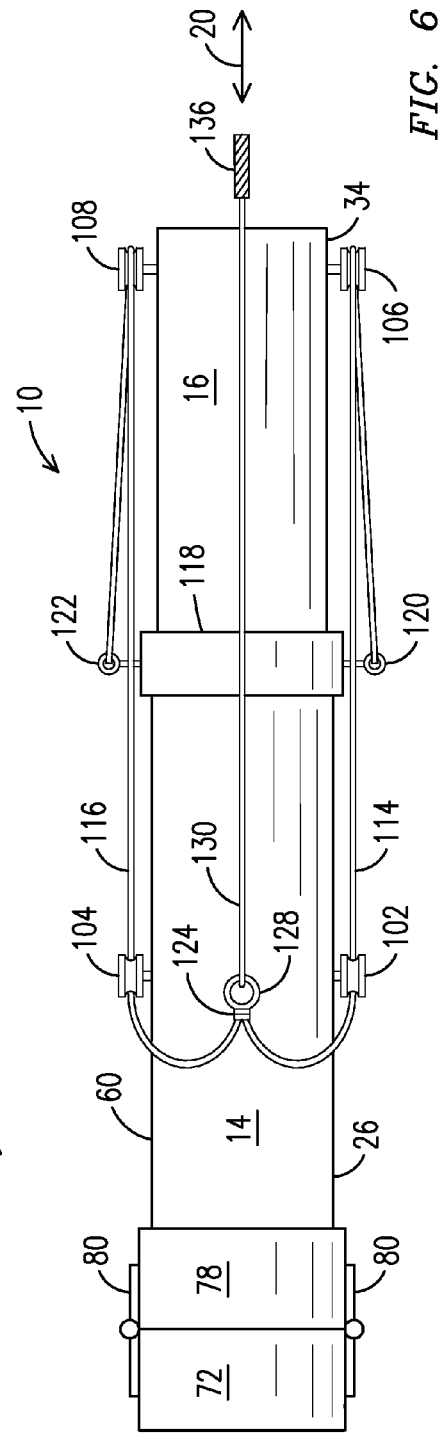

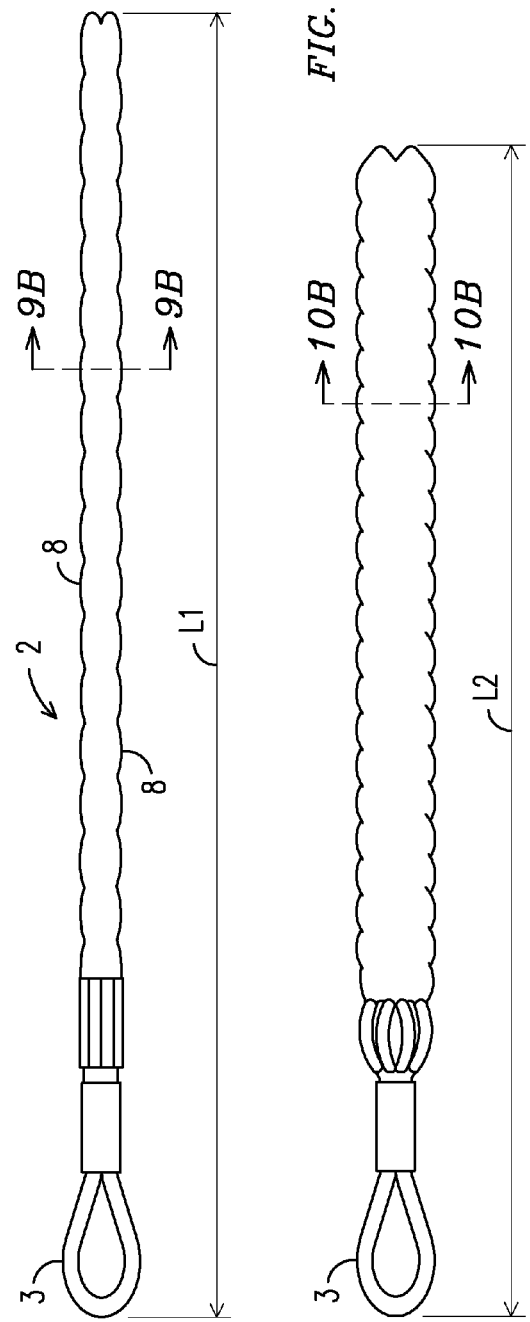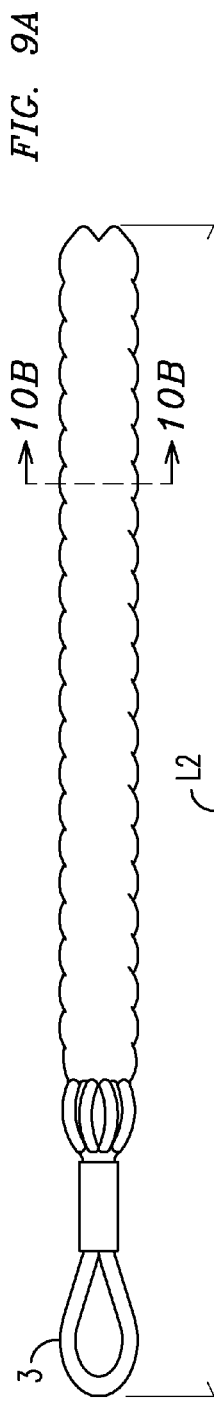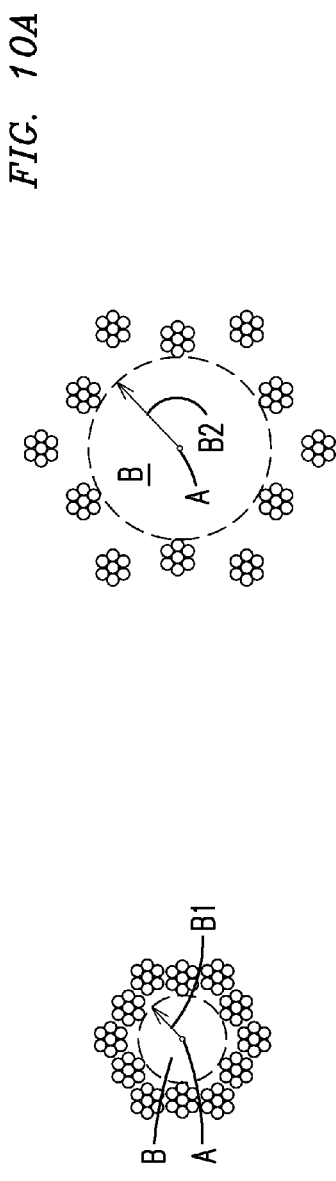

METHOD AND TOOL FOR ADJUSTING CABLE GRIPS

FIELD OF THE INVENTION

This invention relates generally to cable grips of the type adapted to be expanded and contracted radially by endwise compression and extension and, more specifically, to methods and equipment for operating such grips.

BACKGROUND

Cable grips are used extensively in many industries to pull cable segments through conduit, along and between overhead towers, or in structural applications. Such grips are important tools for installation of both electrical and mechanical cables in, for example, bridge structures, hoisting and conveyor cables. Contemporary designs of cable grips were advanced during the first half of the twentieth century by Edgar Kellems, as described in part in U.S. Pat. Nos. 1,670,543, 1,886,026, and 2,664,609, each of which is incorporated herein by reference.

Commonly, a grip has a bore at one end and an eye portion at a distal end. With a cable which is to be pulled or secured placed in the bore, the grip is tightened about the cable and the eye portion is attached to a hook, or another cable or another type of mechanical linkage, in order to place the grip under tension. Such grips are generally fashioned as woven wire tubes with meshes of wire much smaller in gauge than the size of the cable inserted within the bore. Commonly, such grips are available in a large variety of sizes for application to mechanical cable and electrical wire varying in radial dimension from relatively small sizes such as used in residential electrical applications to large dimensions on the order of about two inches (5.08 cm) or greater. Cable grips are useful for pulling, positioning, routing and providing for strain relief of cables.

When attaching a grip to a cable, the grip is contracted along a longitudinal axis in order to enlarge the radial dimension of the bore about the longitudinal axis and thereby permit entry of the cable into the grip bore. Once the cable is positioned in the bore, the diameter of the bore opening is reduced to tighten the grip about the cable. Grips of this type are designed for limited ranges of cable size to assure that the grip can be used to reliably pull or secure the cable.

BRIEF DESCRIPTION OF THE INVENTION

According to one embodiment of the invention a tool is provided for adjusting a grip to secure a cable within a bore in the grip surrounded by interlaced wiring. The grip is of the type which is extendable in length along a longitudinal direction so that, as the length of the grip is extended or contracted, the size of the bore is adjusted to a relatively large size in a radial direction to receive the cable or to a relatively small size in a radial direction to position the wiring against the cable. The grip has a characteristic external size in the radial direction when the bore is the relatively large size. The tool includes first and second tubular sections for containing the grip while receiving the cable into the bore, with each section having first and second ends. The second section is sized for positioning within the first section in a telescopic arrangement so that the sections provide an assembly extendable in length along a longitudinal axis. The first section has an interior dimension, in a radial direction transverse to the longitudinal axis, at least as large as the characteristic external size of the grip. The first section includes a first stop providing an opening that permits introducing the cable through the first end and into the first tubular section while the grip is contained in the tool so that movement of the grip out of the first tubular section through the first end is blocked. The second tubular section includes a second stop positioned in the second tubular section. With the grip positioned in the first and second tubular sections and between the first and second stops, when the second tubular section is displaced along the longitudinal axis and toward the first stop, a force is transferred against the grip, causing the size of the bore to increase.

A related method is also provided for adjusting a grip to secure a cable within a bore in the grip. With the grip bore surrounded by interlaced wires, the grip is characterized by an extended length in a longitudinal direction when in a relaxed state and a contracted length in the longitudinal direction when in a compressed state. The grip has a characteristic external dimension, measurable in a radial direction transverse to the longitudinal axis. When the grip is in the compressed state, with the bore having a characteristic first relatively large dimension, the first relatively large dimension is of sufficient size that the cable can be received into the grip bore. The method includes providing first and second tubular sections each having first and second ends, with the second section sized for positioning within the first section in a telescopic arrangement so that the combination of sections provides an assembly extendable in length along a longitudinal axis. The first section has an interior dimension, in a radial direction transverse to the longitudinal axis, at least as large as the characteristic external dimension of the grip in the compressed state with the bore configured to the characteristic first relatively large dimension at which the cable can be received into the grip bore. With the second tubular section positioned within the first tubular section, the second tubular section is extended telescopically from the first tubular section so that the first and second sections additively provide an interior length along the longitudinal axis at least as long as the extended length of the grip when the grip is in the relaxed state. A first opening is provided at a first end of one of the tubular sections of such dimension as to permit entry of the grip into said one of the tubular sections. The grip is inserted through the first opening, into said one of the tubular sections and into the other of the tubular sections until the grip reaches a stopping point. The size of the first opening is reduced to confine the grip within said one of the tubular sections when a compressive force is applied to the grip from the first end of said one of the tubular sections. The second tubular section is displaced within the first tubular section to reduce the interior length additively provided by the first and second sections to less than the extended length of the grip when the grip is in the relaxed state. This displacing results in application of the compressive force to reduce the length of the grip. According to an embodiment of the method, with the length of the grip so reduced, the cable is inserted into the grip bore.

In still another embodiment, a tool is provided for adjusting a grip to secure a cable within a bore in the grip surrounded by interlaced wiring. The grip is extendable in length along a longitudinal direction so that, as the length of the grip is extended or contracted, the size of the bore is adjusted in a radial direction transverse to the longitudinal direction to a relatively large size to receive the cable or to a relatively small size to position the wiring against the cable. The grip is of the type having a characteristic external size in the radial direction when the bore is the relatively large size. The tool includes a tubular section for containing the grip while receiving the cable into the bore. The tubular section has a length along a longitudinal axis and an interior dimension, in a radial direction transverse to the longitudinal axis, at least as large as the characteristic external size of the grip. A first stop is positioned in or near a first end of the tubular section to provide an opening that permits introducing the cable through the first end and into the tubular section while the grip is contained in the tool. Movement of the grip out of the first tubular section through the first end is thereby blocked. A second stop is positioned along the longitudinal axis wherein one of the first and second stops is arranged for displacement along the longitudinal axis with respect to the other stop. With the grip positioned in the tubular section and between the first and second stops, when one of the stops is displaced toward the other stop a force is applied against the grip, causing the size of the bore to increase and the length of the grip to be contracted.

BRIEF DESCRIPTION OF THE DRAWINGS

These and other features, aspects, and advantages of the present invention will become better understood when the following detailed description is read with reference to the accompanying drawings in which like characters represent like parts throughout, and wherein:

FIG. 4 illustrate one embodiment of a first stop in the form of a removable cap positioned at an end of a first section of the tool shown in FIG. 1 wherein:

FIG. 5 illustrate a second embodiment of a first stop positioned at an end of the first section of the tool shown in FIG. 1 wherein:

FIG. 5D is a perspective view of the first stop in an open configuration, taken along the longitudinal axis of the tool, illustrating two ring halves 72, 74 hinged to a collar.

FIG. 6 is a second longitudinal view of the tool shown in FIG. 1, illustrating rigging cord and pulleys which effect movement of one section of the tool with respect to another section of the tool;

FIG. 9A is a longitudinal view of the grip of FIG. 7 adjusted to a first length;

FIG. 9B is a view of the grip of FIG. 7 taken along line 9B-9B shown in FIG. 9A in a direction perpendicular to the axis, A when the grip is adjusted to the first length shown in FIG. 9A;

FIG. 10A is a longitudinal view of the grip of FIG. 7 adjusted to a second length;

FIG. 10B is a view of the grip of FIG. 7 taken along line 10B-10B shown in FIG. 10A in a direction perpendicular to the axis A when the grip is adjusted to the second length shown in FIG. 10A;

In accordance with common practice, the various described features are not drawn to scale, but are drawn to emphasize specific features relevant to the invention.

DETAILED DESCRIPTION OF THE INVENTION

Figure 7A:
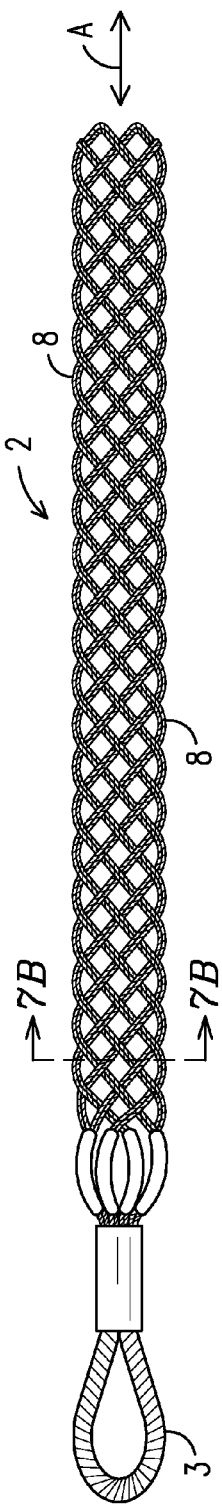
FIG. 7A is a longitudinal view of a grip in a straight configuration, extending along an axis A.
Figure 7B:
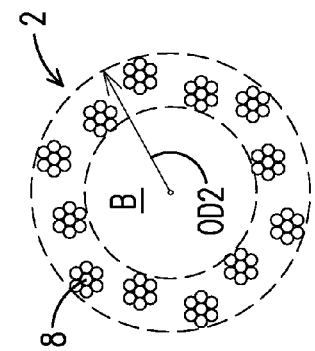
FIG. 7B illustrates the grip of FIG. 7A in a view taken along a direction perpendicular to the axis A.
Figure 8B:
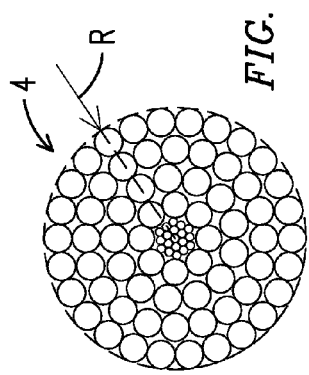
FIG. 8B is a view of the cable shown in FIG. 8A taken along line 8B-8B shown in FIG. 8A in a direction perpendicular to the axis.
Figure 8A:
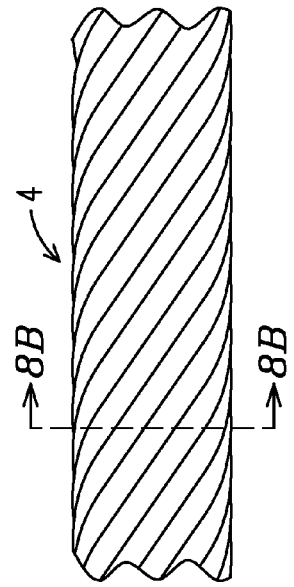
FIG. 8A is a longitudinal view of a straight length of cable extending along an axis A, which cable may be inserted into the grip of FIG. 7.

FIG. 7A illustrates a generic grip 2 exemplary of the type used to pull cable, including electrical wire, such as the segment of cable 4 shown in FIGS. 8A and 8B. Grips of this type may be referred to as a multi-weave style. They are available from numerous providers including Brenco, Inc. of Harrison Ohio USA. In the view of FIG. 7A the grip 2 is positioned to extend longitudinally along a straight axis A. The grip has at a first end an integrally formed eye loop 3 into which a hook may be placed to pull the grip when the cable is attached to the grip. As more fully described herein, the portion of the grip extending from the eye loop to the opposing end is tubular. The exemplary segment of cable 4 is a straight length as shown in FIG. 8A which extends longitudinally along the straight axis A for insertion into the grip 2. The segment of cable has a substantially circular profile in cross section with radius R as indicated in FIG. 8B. As is well known, grips of this type comprise a number of individual cables or wires 8 which are interlaced with one another to fit around the cable segment. By interlaced it is meant that the wires 8 of the grip are crossed, passing over or under one another, or woven together, e.g., braided, or otherwise intertwined. The wires 8 may each be formed of a series of smaller gauge wires which are wound together in, for example, a spiral configuration. As shown in the view of FIG. 7B, taken along a direction perpendicular to the axis A, the grip is essentially a tubular shaped sheath defining an interior bore, B, into which the cable 4 may be slid. Generally, the interlacing arrangement of the wires 8 to form the grip 2 provides an adjustable assembly that can be configured to provide a variable radial dimension to the bore B with a corresponding variable outside diameter OD2 to the grip 2.

For example, as shown in FIGS. 9A and 9B, the grip 2 may be adjusted to have a first length L1, as measured along the longitudinal axis A, for which length the bore B has a more or less circular shape extending a radial distance B1 from the axis A. Referring next to FIGS. 10A and 10B, the grip 2 may be contracted to a second, shorter length L2, also measured along the axis A, for which length the bore B again has a more or less circular shape. When the grip length is reduced to L2 the bore expands from the radial dimension B1 to a larger radial distance B2 from the axis A. Compare FIGS. 9B and 10B. Generally, so long as L1 is greater than L2, the radial dimension B2 is greater than the radial dimension B1.

For a cable radius R, on the order of the radial dimension B1, when the grip bore is adjusted to the larger radial dimension B2, the cable 4 can be inserted into the bore. When the grip length is extended to reduce the bore size to the radial dimension B1, the interlaced wires can press against the inserted cable to firmly attach the grip to the cable as the grip is pulled with a force directed along the longitudinal axis A.

Figure 1:
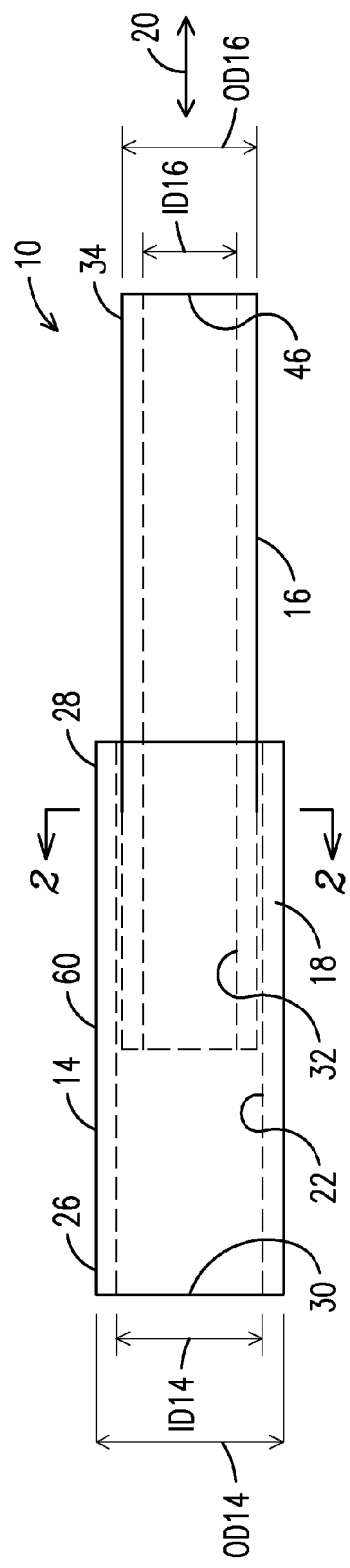
FIG. 1 is a simplified view of an adjustment tool, taken along a longitudinal axis, for insertion of cable into a grip according to one embodiment of the invention.

According to an example embodiment of the invention, a partial and simplified view of an adjustment tool 10 for insertion of cable into a grip is shown in FIG. 1. The tool 10 comprises a pair of tubular sections 14 and 16. The wall 18 of the section 14 has a cylindrically shaped inner surface 22, within which the section 16 can be slid to extend and contract the tool 10 in a telescoping manner. Thus the length of the tool 10 is adjustable as measured along an axis 20 which is more or less central to the two sections 14 and 16. The first tubular section 14 includes first and second opposing ends 26 and 28, and the second tubular section includes first and second opposing ends 32 and 34. The first end 26 of the section 14 has an opening 30, the size of which may be defined by the inner wall surface 22 or which may be reduced relative to the diameter of the cylindrical shaped surface 22. In the illustrated embodiments the opening 30 is sized such that when the bore B of the grip 2 is expanded to the larger radial dimension B2, the opening 30 is large enough to permit the grip 2 to pass through the opening 30.

According to one feature of the invention, the size of the effective opening, permitting entry of the grip 2 into or out of the section 14 through the end 26, can be reduced. For example, a second opening, of reduced size relative to the opening 30, can be formed at or about the end 26 of the section 14 by placement of a cap over the end 26. The cap includes an opening of such reduced size as to permit insertion of the cable 4 through the cap and into the grip bore. The cap also confines movement of the grip after the grip is placed within the tool 10. In the following example, the opening in the cap is smaller than the outside dimension B1 of the grip 2. Accordingly, when the bore B of the grip 2 is configured to the radial dimension B1, which is smaller than the dimension B2, the cap opening is of such reduced size relative to the opening 30 that the grip cannot pass through the cap.

Figure 2:
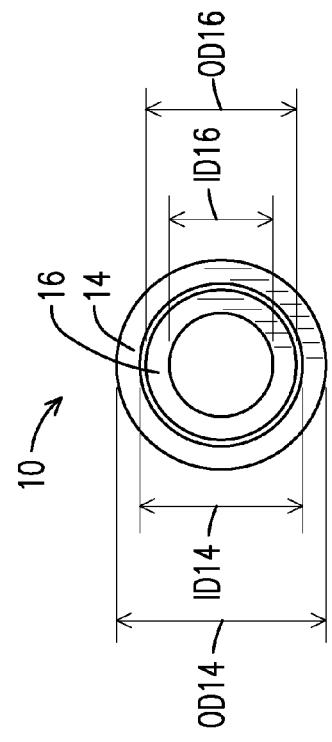
FIG. 2 is a view in cross section of the tool shown in FIG. 1, taken along a direction transverse to the longitudinal axis.

For the illustrated embodiments the sections 14 and 16 are cylindrically shaped lengths of pipe, e.g., comprising galvanized steel, aluminum or plastic. The section 16 has an outside diameter OD16 smaller than the inside diameter ID14 of the wall 18 of the tubular section 14. With this arrangement the section 16 can slide along the inner wall surface 22 of the section 14. See, also, the view in cross section of FIG. 2 which illustrates this nested arrangement along a direction transverse to the axis 20. The section 16 may have, for example, an outside diameter OD16 of approximately 3.5 inches (8.8 cm) and an inside diameter ID16 of approximately 3.25 inches (8.3 cm). The section 14 may have, for example, an outside diameter OD14 of approximately 4 inches (10.2 cm) and an inside diameter ID14 of approximately 3.75 inches (9.5 cm).

Figure 3:
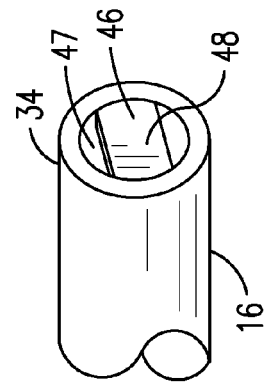
FIG. 3 is a perspective view of the tool shown in FIG. 1 illustrating an exemplary plate mounted to partially close off an end of a section of the tool.

As per the example embodiments illustrated in FIGS. 3, 4 and 5, the tool 10 includes a first stop 40 mounted at or near the first end 26 of the section 14 and a second stop 46 positioned along the second section 16 at or near the second end 34. The first stop 40 can be placed at a variety of positions near the end 26 of the section 14 and the second stop can be placed at a variety of positions near the end 34 of the section 16. The tool 10 is shown in FIG. 1 with the first end 32 of the second section 16 extending through the second end 28 and partly into the first section 14. When the section 16 is further displaced toward the first end 26, the second stop 46 is also displaced toward the first end 26 thereby reducing the distance between the first stop 40 and the second stop 46. The second stop 46 may be a plate 48 covering the opening 47 of the pipe section 16 at the second end 34. When the section 16 is formed of steel pipe, the plate 48 forming the stop can be welded to close off the end 34. See, for example, the perspective view of the section 16 shown in FIG. 3, which illustrates a plate 48 mounted to partially or completely close off the opening 47 at the end 34 of the section 16. In other embodiments the plate 48 may be attached to the end of the section 16 with removable fasteners or may be a threaded end cap. More generally, the stop 46 is positioned to prevent the grip 2 from passing through the second end 34 of the section 16. For example, with the grip 2 expanded to the length L2 and inserted into the tool through the opening 30, when the section 16 is displaced toward the first end 26 of the first section 14, the second stop 46 can transfer forces along the direction of the axis 20 from the section 16 to the grip as the second stop 46 moves toward the first end 26.

Figure 4A:
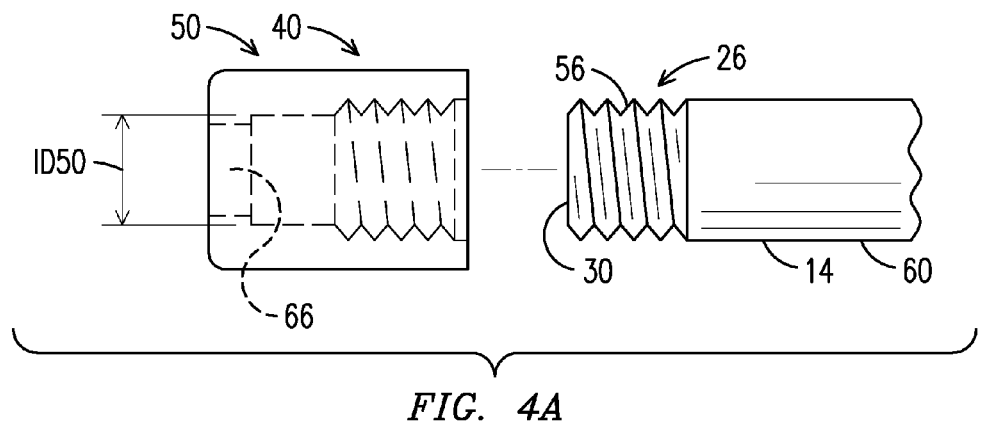
FIG. 4A is a view of the removable cap taken along the longitudinal axis of the tool.
Figure 4B:
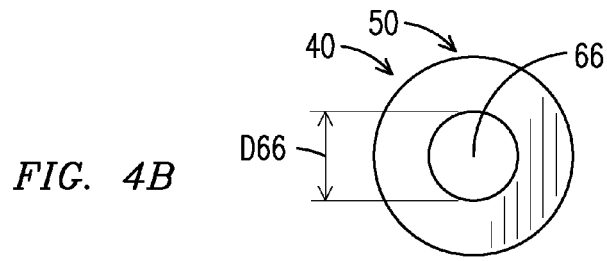
FIG. 4B is a view in cross section taken along a direction perpendicular to the longitudinal axis.

With the sections 14 and 16 each formed in accord with cylindrical pipe geometries, the first stop 40 may be a threaded end cap 50 such as shown in the cross sectional view of FIG. 4A, taken along the axis 20. The exemplary cap 50 has an inside diameter ID50 slightly larger than the outside diameter OD14 of the section 14 and includes threads 52 along an interior surface 54 thereof so that the cap can be threaded over mating threads 56 formed on the exterior surface 60 of the section 14 along the end 26. The cap 50 includes an aperture 66 of reduced size relative to the opening 30. See, also, the cross sectional view of FIG. 4B taken along a direction perpendicular to the axis 20 and along the aperture 66.

Figure 4C:
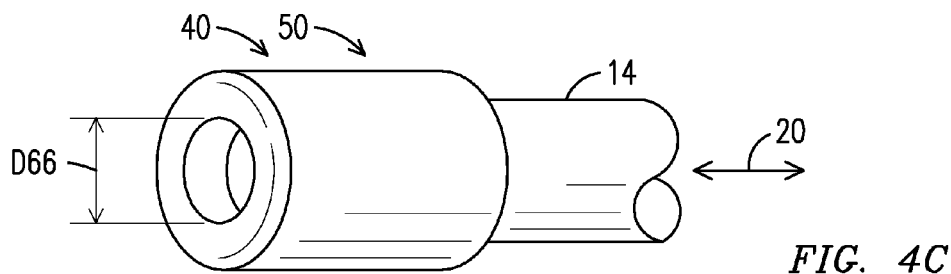
FIG. 4C is a perspective view of the installed cap.

With the cap 50 threaded on the section end 26, as shown in the perspective view of FIG. 4C, and with the grip 2 positioned within the tool 10 (not shown), the aperture 66 provides an effective opening size which permits insertion of the cable 4 into the grip bore while at the same time confining movement of the grip within the tool 10. With the cap 50 removed from the end 26 of the section 14, the grip can be moved in or out of the tool 10 through the larger opening 30 at the end 26 of the section 14. In this example, the aperture 66 is circular in shape with a diameter D66 larger than the outside dimension, 2R, of the cable 4, but is smaller than the inside diameter ID14 of the tubular section 14.

For the illustrated embodiments, the aperture diameter D66 is also smaller than the outside radial dimension of the grip 2 (measured from the axis A in a plane perpendicular to the axis A) when the grip bore extends the radial distance B2 from the axis A, i.e., when the grip is reduced to the shorter length L2. Also for the illustrated embodiments, when the grip bore is configured to extend only to the smaller radial distance B1, the cap aperture 66 is then also too small to permit the grip to pass through the cap.

According to an alternate embodiment of the first stop 40, FIG. 5 illustrate a two piece end cap 70 attached to the end 26 of the section 14. The cap 70 comprises a ring-like structure formed in two ring halves 72 and 74 which are each hinged to a first collar 78. The collar 78 is of cylindrical shape having an inside diameter slightly larger than the outside diameter, OD14, of the tool section 14 so that the collar 78 can be mounted on the exterior surface 60 of the section 14 along the end 26. By way of example, with the section 14 and the collar 78 each fabricated from segments of cylindrically-shaped steel pipe having different diameters, the collar can be welded to the section 14 or may be attached to the section 14 with fasteners. Each of the ring halves 72 and 74 is also of cylindrical shape (e.g., in the shape of a half cylinder), and can also be fabricated from a section 82 of pipe having the same inside diameter as the collar 78. Each section 82 may be cut from the cylindrically-shaped pipe to provide a half cylinder shape as shown in FIG. 5. A flat plate 84 having the contour of a half of a ring, e.g., the shape of a letter "C", is welded to an end of each section 82. As now described, with the cap installed along the end 26 of the section 14, and with a section 82 and a plate 84 forming each of the ring halves 72, 74, the ring halves are brought together by means of hinge mechanisms, and the plates provide the first stop 40. An aperture 86 is formed in the first stop through which the cable 4 can be inserted into the tool section 14.

Each of two hinges 80 connects one of the two ring halves 72, 74 to the collar 78. See the perspective view of FIG. 5A and the elevation view of FIG. 5B, taken along the axis 20. The ring halves 72, 74 are shown in a closed configuration wherein the plates 84 have reduced the effective opening to the end 26 of the section 14. In the closed configuration of FIGS. 5A and 5B, the ring halves have come together to form the complete ring cap 70 with the reduced effective opening. When the cap 70 is closed the pair of plates 84 meet to form a complete, but segmented ring having a circular cap aperture 86 with a diameter D86 larger than the outside dimension, 2R, of the cable 4. The diameter D86 is smaller than the inside diameter ID14 of the tubular section 14 and smaller than the largest outside radial dimension of the grip 2 (again measured from the axis A in a plane perpendicular to the axis A) when the grip is reduced to the shorter length L2. Preferably, when the grip bore, B, is configured to the smaller radial dimension B1, the cap aperture 86 formed by the two piece end cap 70 is also too small to permit the grip 2 to pass through the cap 70.

The ring halves 72, 74 can be secured in the closed configuration by inserting a pair of locking pins 90 through each ring half and into the wall 18 of the section 14. In the example shown in the figures, a pair of ring apertures 92 are formed in each of the ring halves. See FIG. 5C which provides an end view of the two ring halves 72, 74 in the closed configuration of FIGS. 5A and 5B mounted on the tool section 14. The view of FIG. 5C is taken through a portion of the axis 20 within the section 14 without showing the section wall 18. Each hinge 80 is mounted about a point of symmetry 88 along each half cylinder shape of a section 82. Each section 82, being in the shape of a half cylinder, is an arc extending from the point of symmetry 88 some ninety degrees about the axis 20 in each direction with respect to the point of symmetry 88. The ring apertures 92 of each section are formed about 80 degrees from the point of symmetry 88, near an end of the arc of the half cylinder shape. In other embodiments the cylindrically shaped sections need not be identical and the cap 70 need not have symmetrically formed components.

The locking pins 90 can each be reversibly placed through one of the ring apertures 92 formed in the sections 82 and further into wall apertures 94 (shown in FIG. 5D) formed in the wall 18 along the end 26 of the section 14. The wall apertures 94 are each formed in the tool section 14 along the end 26. The wall apertures are positioned in the section 14 for alignment with the corresponding ring apertures 92 formed in the sections 82 when the two ring halves 72, 74 are in the closed configuration of FIGS. 5A and 5B.

A pair of the ring apertures 92 and a pair of the wall apertures 94 are shown in the perspective view of FIG. 5D which illustrates the ring halves 72, 74 in an open configuration. In this open configuration the ring halves 70, 72 have been swung outward and away from the larger opening 30 of the section 14 so that the grip 2 can be moved in or out of the tool 10 through the opening 30. In this example, with the cap aperture 86 being circular in shape, the aperture 86 has a diameter D86 which is larger than the outside dimension of the cable 4 but smaller than the inside diameter ID14 of the tubular section 14 and smaller than the outside dimension of the grip 2 when the grip is reduced to the shorter length L2. Preferably, even when the grip bore is configured to the smaller radial dimension B1, the cap aperture 86 is too small to permit the grip to pass through the cap. Generally, for both of the disclosed embodiments of the stop 40 (i.e., see FIGS. 4 and 5), with the grip 2 having an approximately circular shape about the bore and a length L2, the aperture 66 of the cap 50 and the aperture 86 of the cap 70 are, preferably, sized such that the outside diameter OD2 of the grip is too large to fit through the cap apertures.

Figure 5E:
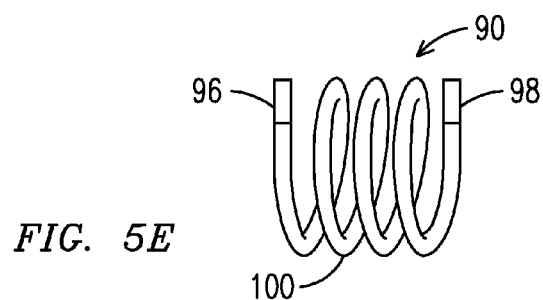
FIG. 5E illustrates a pair of locking pins, each formed at an end of a segment of coiled wire.
Figure 5A:
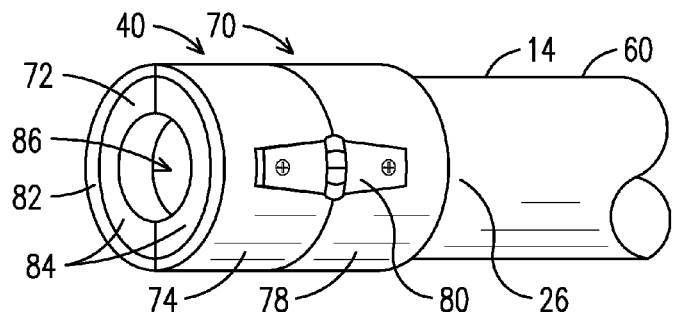
FIG. 5A is a perspective view of the first stop in a closed configuration.
Figure 5B:
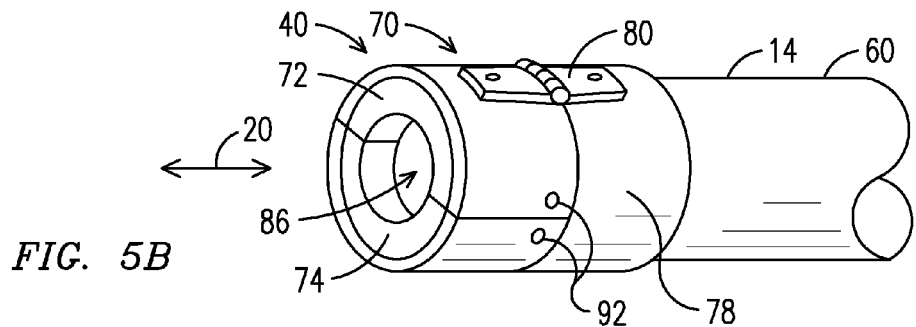
FIG. 5B is a second view of the first stop shown in FIG. 5A, taken along the longitudinal axis of the tool, positioned about the end of the first section of the tool.
Figure 5C:
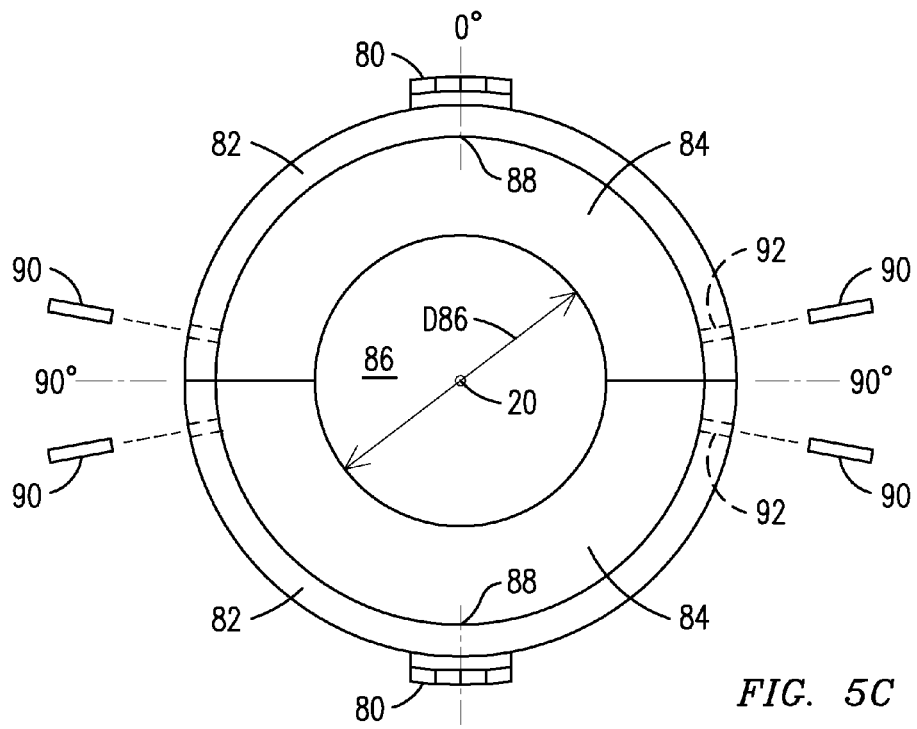
FIG. 5C is an end view of the first stop shown in FIG. 5A, in a closed configuration, taken along a direction perpendicular to the longitudinal axis of the tool.

When the two piece end cap 70 is swung from the open configuration of FIG. 5D to the fully closed position shown in FIGS. 5A and 5B, the first and second ring halves 72, 74 of the end cap 70 are securely positioned about the opening 30 by placement of the locking pins 90 through the ring apertures 92 and into the wall apertures 94. The locking pins 90 may, as illustrated in FIG. 5E, be formed in pairs as opposing ends 96, 98 of a segment of stiff coiled wire 100 providing spring resilience. The gauge of the coiled wire and the size of the apertures are selected so that the wire ends 96, 98 are insertable within the ring apertures and the wall apertures to provide a snug fit. The segments of coiled wire 100 can be tethered to the first collar 78 with a clamping cable assembly that is fastened to both the collar and the coiled wire 100.

In the configuration of FIGS. 5A, 5B and 5C, the "C" shaped flat plates 84 have come together to form a complete ring-shaped cover which reduces the effective opening at the section end 26 to the diameter D86 of the aperture 86. Generally, when the first and second ring halves 72, 74 of the end cap 70 are in the closed position over the opening 30, the flat plates 84 are positioned to extend inward from the surface 20 of the wall 18 of the tubular section 14 to provide an opening at or near the first end 26 which is smaller in diameter than ID14.

Next, referring to FIG. 6, the tool 10 is shown to also include tackle comprising rigging cord and pulleys to effect movement of the tubular section 16 with respect to the tubular section 14. FIG. 6, a longitudinal view of the tool 10 along the axis 20, illustrates a first pair of pulley blocks 102, 104 positioned along the end 26 of the section 14 and a second pair of pulley blocks 106, 108 positioned along the end 34 of the section 16.

Noting that the second section 16 can be rotated about the axis 20 with respect to the first section 14, the pulley block 102 of the first pair is rotationally aligned with the pulley block 106 of the second pair for movement of a first cord segment 114. Similarly, the pulley block 104 of the first pair is rotationally aligned with the pulley block 108 of the second pair for movement of a second cord segment 116. Along the second end 28 of the section 14 a second collar 118 is formed over the outside surface 22 of the section 14. The second collar 118, like the first collar 78, is of cylindrical shape having an inside diameter approximately equal to the outside diameter, OD14, of the section 14.

The collar 118 is mounted on the exterior surface 60 of the section 14 along the end 28 of the section 14. By way of example, with the section 14 and the second collar 118 each fabricated from segments of steel cylindrically-shaped pipe having different diameters, the second collar 118 can be welded to the section 14 or may be attached to the section 14 with fasteners. On the mounted second collar 118 there are positioned a pair of eyelets 120, 122. The eyelet 120 is rotationally aligned about the axis 20 with the pulley blocks 102, 106 so that the cord segment 114 can be extended in a more or less straight path from the eyelet 120, the cord segment 114 passing through the pulley block 106 and then through the pulley block 102. Similarly, the eyelet 122 is aligned about the axis 20 with the pulley blocks 104, 108 so that the cord segment 116 can be extended in a more or less straight path from the eyelet 122, the cord segment 116 passing through the pulley block 108 and then through the pulley block 104. The cord segment 114 may be tied to the eyelet 120. Similarly, the cord segment 116 may be tied to the eyelet 122. In an alternate design, the cord segments 114 and 116 may be part of one continuous cord length with each cord segment passing through one of the eyelets, then around a portion of the second collar 118 to the other cord segment.

The cord segment 114 extends from the eyelet 120, through the pulley block 106, through the pulley block 102 and to a tie point 124. Similarly, the cord segment 116 extends from the eyelet 122, through the pulley block 108, through the pulley block 104 and to the tie point 124. At the tie point 124 the two cord segments 114 and 116 may be braided together to form one pull segment. In an alternate arrangement as shown in FIG. 6, the two cord segments 114 and 116 may be tied to a ring 128 at the tie point 124. A first end of a pull cord 130 is also tied to the ring 128 to provide a single pull line that can be used to exert a force against the eyelets 120 and 122 and against the second end 128, which force causes movement of the tool section 16 toward the first stop 40, e.g., the cap 70. During use of the tool 10 the pull cord 130 extends from the tie ring 128 along both of the sections 114 and 116 toward and beyond the end 34 of the second section 16. A grip handle 136 is attached to a second end of the pull cord opposite the first end which is tied to the ring 128. With this arrangement, when the pull cord 130 is tensioned by applying a force to the grip handle 136 in the direction of the tool axis 20, the tie point 124 and the ring 128 are centrally located along the tool section 14 between the pairs of pulley blocks 102, 104 and 106, 108.

An exemplary tool 10 has been described for adjusting a grip of the type used to firmly hold a cable for purposes of pulling or tensioning the cable. According to one embodiment, a method for adjusting the grip begins with adjusting the tool to extend the section 16 outward from the section 14 so that the length of the tool 10, as measured between the first stop 40/56 and the second stop 46 is at least as long as the grip 2 when the grip is in a relaxed state. The end 26 of the tool section 14 is opened to a dimension which permits entry of the grip 2 into the tool. In accord with the embodiment shown in FIG. 4, for which the first stop 40 is a threaded cap 50, the cap is removed from the tool 10 to expose the opening 30 and make the effective diameter for entry of the grip equal to the inside diameter ID14 of the section 14. In accord with the second embodiment shown in FIG. 5, for which the first stop is the two piece end cap 70 attached to the end 26 of the section 14, the ring halves 72 and 74 are positioned in an open configuration to expose the opening 30 and make the effective diameter for entry of the grip equal to the inside diameter ID14 of the section 14. The grip 2 is then slid through the opening 30 and into the tool sections 14 and 16 until it reaches the second stop 46.

Next, in the method for adjusting the grip, the end 26 of the tool is closed, e.g., partially blocked, with the first stop 40, either by threading the cap 50 on to the end 26 of the section 14 or by closing the two piece end cap 70 by configuring the two ring halves 72 and 74 in a closed configuration. In accord with the embodiments comprising a two piece end cap, ring halves are secured in the closed configuration by inserting the locking pins 90 through each ring half and into the wall 18 of the section 14 so that the ring halves cannot rotate about the hinges 80. With the stop 40 so secured at the end 26 of the tool section 10, the end of the grip 2 opposite the eye loop 3 may be manually spread to a larger radial dimension. This can assure that the outside dimension of the portion of the grip positioned against the first stop 40 is larger than the aperture 66 or 86, i.e., so that the grip is positioned against the cap and does not pass through the aperture.

To effect contraction of the grip when placed between the stops 40 and 48, the pull cord 130 is tensioned, thereby tensioning the cord segments 114 and 116. Consequently a pulling force is exerted against the eyelets 120, 122. With both the eyelets 120, 122 and the pulley blocks 102, 104 fixed to the tool section 14, as the pulling force increases, forces exerted via the cord segments 114, 116 against the pulley blocks 106, 108 displace the tool section 16 toward the end 26 of the tool section 14. In the process of so displacing the tool section 16 the distance between the stops 40 and 46 decreases, thereby transferring a compressive force along the longitudinal axis of the grip 2. As the length of the tool 10 contracts, the grip is forced into a contracted state and the radial dimension of the grip bore, B, increases. The process of contracting the grip continues until the diameter of the grip bore increases beyond the outside dimension, e.g., diameter, of the cable 4.

Once the grip bore dimension is larger than the outside dimension of the cable 4, the cable is inserted through the aperture 66 or 86 of the first stop and into the grip bore. as is typical, the cable may be inserted substantially or entirely into the full length of the bore to assure that sufficient surface area of the grip wire mesh is in contact with the outside surface of the cable. Once the cable is inserted the tension imposed via the pull cord 130 is released and the cable is secured by the grip.

Figure 11A:
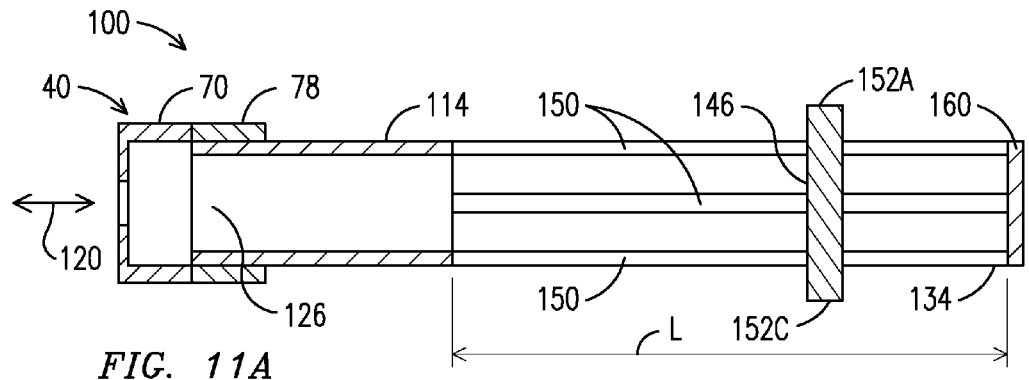
FIG. 11A is a view in cross section of a tool according to another embodiment.

In other embodiments of the invention a tool 100 may consist of a single major tubular section 114 with a first end 126 having a first stop 40, e.g., such as described for the tool 10 where a cap 50 or 70 is attached thereto. FIG. 11A is a view in cross section taken along a longitudinal axis 120 of such an exemplary tool 100 having the combination of the cap 70 and collar 78. The tubular section may be a steel pipe but other materials (e.g., Aluminum) and shapes are contemplated. In lieu of the tool 100 comprising a second tubular section extendable in and out of the first section in a telescoping manner, the first section 114 includes a displaceable stop 146, generally of a circular shape, near the second end 134 of the first section. In one embodiment, movement of the second stop 146 may be controlled through use of tackle similar to arrangements described for the tool 10. The second stop 146 may be displaced along the longitudinal axis 120 of the tool 100 with the aid of one or more tracks in the form of slots 150 formed in the single tubular section. The slots 150 may be positioned at ninety degree intervals about the axis 120, in which case the second stop 134 includes four tabs 152A, 152B, 152C and 152D which extend from the circular shape for insertion into the slots 150. See FIGS. 11B and 11C.

Figure 11B:
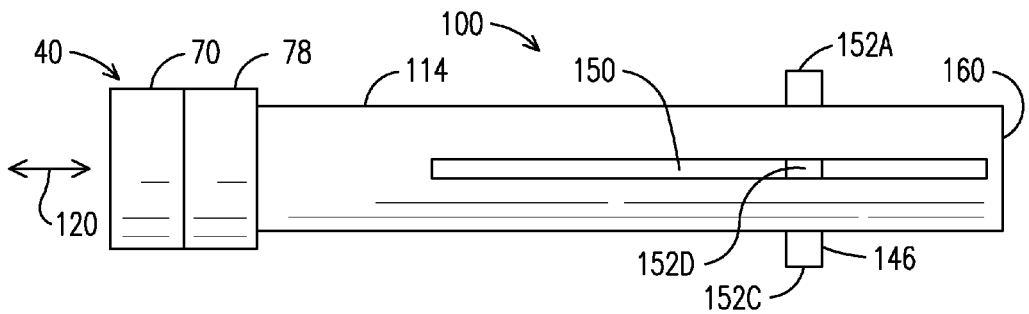
FIG. 11B is a view of the tool shown in FIG. 11A taken along a longitudinal axis.
Figure 11C:
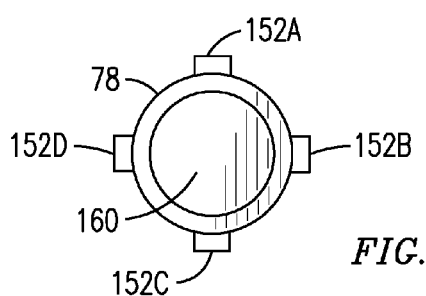
FIG. 11C is a view of a stop shown in FIG. 11A.

FIG. 11B is a plan view of the tool 100, taken along the longitudinal axis 120 and FIG. 11C is a view taken along a major surface of the stop 146, illustrating the four tabs 152A-152D. When positioned in the tube 114 the tabs extend through the slots 150 formed in the tubular section 114. Cord segments of the rigging may be attached to portions of the tabs that extend through the slots. Attachment of the cord segments may be fixed or may be via pulley blocks attached to tabs of the second stop along the outside of the single tubular section 114. Generally, the slots 152A-152D are of a sufficient length, L, to provide a predetermined distance through which the stop 134 can be displaced in order to adjust a grip 3 which has been inserted within the tubular section 114. The slots terminate at the second end 134 of the section 114. A fixed or removable third end stop 160 is positioned at the second end 134 to terminate the slots. Numerous other arrangements will be apparent to those skilled in the art to form the first, second and third stops 50, 146 and 160 for operation of a tool according to the invention.

Figure 12:
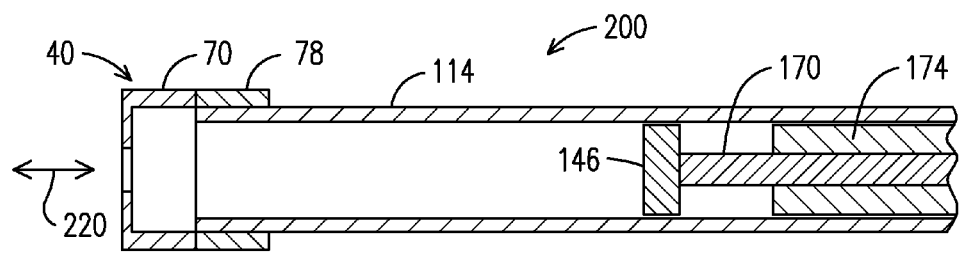
FIG. 12 is a view in cross section of another embodiment of a tool according to the invention.

In still other embodiments of tools according to the invention, operation may be effected with powered assistance such as electric or pneumatic devices which displace one of the stops in the direction of the other stop. For example, the tool 10 may be driven with an actuator coupled to one of the sections 14 or 16 to expand the bore of the grip 2. In other example embodiments of powered operation, the tool may consist of a single major tubular section as shown in FIG. 11 with a first end 126 having a first stop 40 wherein the displaceable stop 146 is actuator driven. With reference to FIG. 12 a tool 200 is shown in cross section along a longitudinal axis 220. The tool 200 comprises numerous components as described for the tool 100, wherein like components are described with like reference numbers. For the tool 200 the displaceable stop 146 may be a piston or, as shown, may be coupled to a piston 170 which is positioned within the tubular section 114 to apply a force against a grip 2 positioned between the stops 40 and 146 to reduce the grip length. Movement of the actuator piston may be controlled to limit the extent to which the actuator driven stop 146 is displaced toward the first stop 40. The piston 170 is displaced with the force of a conventional pneumatic or hydraulic actuator 174. In other designs the piston may be coupled to an electric actuator or other type of powered device. With such arrangements the tool 200 can be adjusted with powered assistance to reliably control the radial dimension of the grip bore to accommodate grips and cables of varied sizes.

Numerous embodiments of a tool have been described which can controllably modify the length of a grip in order to place a cable therein for pulling or tensioning. The tool is useful in a wide variety of applications where is desirable to use a grip to pull or tension cables for a variety of applications. The invention may be advantageously used in applications where grips are attached to large diameter cable, e.g., on the order of about two inches or larger. Those skilled in the art will recognize that use of the tool can at times also be advantageous when attaching smaller grips to cable. The examples used to describe operation of the invention have described cable having a circular shape, a grip having a circular shaped bore and pipes having cylindrical shapes. The invention is not so limited. Numerous additional modifications to the disclosed embodiments will be apparent to those skilled in the art. Accordingly the scope of the invention is only limited by the claims which now follow.

The claimed invention is:

1. A tool for adjusting a grip to secure a cable within a bore in the grip surrounded by interlaced wiring, the grip extendable in length along a longitudinal direction so that, as the length of the grip is extended or contracted, the size of the bore is adjusted, in a radial direction transverse to the longitudinal direction, to a relatively large size to receive the cable or to a relatively small size to position the wiring against the cable, the grip having a characteristic external size in the radial direction when the bore is the relatively large size, the tool comprising:

first and second tubular sections and an end cap for containing the grip while receiving the cable into the bore, each section having first and second ends,
the second section sized for positioning within the first section in a telescopic arrangement so that the sections provide an assembly extendable in length along a longitudinal axis, the first section having an interior dimension, in a radial direction transverse to the longitudinal axis, at least as large as the characteristic external size of the grip,
the end cap having a first relatively small opening of a first size, the end cap configured to be removably attached to the first end of the first section during operation of the tool to sequentially insert the grip within the tool and then secure the cable within the grip wherein, while attached to the first section the end cap serves as
a first stop, with the first relatively small opening fixed about the first end of the first section, so that attachment of the end cap to the first section permits introducing the cable through the first relatively small opening and into the first tubular section while preventing movement of the grip out of the first tubular section through the first end; and
the second tubular section including a second stop positioned in the second tubular section so that, with the grip positioned in the first and second tubular sections and between the first and second stops, when the second tubular section is displaced along the longitudinal axis and toward the first stop a force is transferred against the grip, causing the size of the bore to increase, wherein
the tool includes a relatively large second opening at the first end of the first tubular section so that when the end cap is removed from the first tubular section, the grip can be received through the second opening and into the tool.

2. The tool of claim 1 wherein the end cap has a first thread pattern along an inside surface thereof and the first end of the first section includes a second thread pattern complementary to the first thread pattern and positioned along an exterior surface thereof, for enabling (i) removal of the end cap from the first end of the first tubular section, and (ii) receipt of the grip into the tool through the relatively large second opening.

3. The tool of claim 1 wherein, with the length of the grip contracted after application of the force against the grip along the longitudinal direction, the configuration of the end cap permits introducing the cable through the first stop and into the first tubular section through the first end of the first section so that when the size of the bore is the first relatively large size, the movement of the grip is constrained to maintain the first relatively large bore size.

4. The tool of claim 1 wherein, with the grip positioned in the first and second tubular sections and between the first and second stops, when the second tubular section is displaced along the longitudinal axis and toward the first stop, force transferred against the grip increases the size of the bore and causes the length of the grip to contract.

5. The tool of claim 1 wherein:
the first end of the second section positioned within the first section is adjustable to effect the telescopic arrangement; and
the second stop is positioned at the second end of the second section,
the tool further comprising a cord and pulley system wherein at least one pulley is fixedly attached to each tubular section and at least one cord extends from one of the sections to the other section and about each of the pulleys to provide a pulling arrangement wherein the second tubular section is displaced when the cord is pulled so that distance between the first stop and the second stop is reduced.

6. The tool of claim 5 wherein, with the grip positioned between the first and second stops, when the cord is pulled so that distance between the first stop and the second stop is reduced, the size of the bore increases and the length of the grip is reduced.

7. The tool of claim 1 wherein the second opening is of a size larger than the first opening and the end cap comprises an adjustable split collar enabling selection of the second opening to permit receipt of the grip there through and into the tool.

8. A tool for adjusting a grip to secure a cable within a bore in the grip surrounded by interlaced wiring, the grip extendable in length along a longitudinal direction so that, as the length of the grip is extended or contracted, the size of the bore is adjusted, in a radial direction transverse to the longitudinal direction, to a relatively large size to receive the cable or to a relatively small size to position the wiring against the cable, the grip having a characteristic external size in the radial direction when the bore is the relatively large size, the tool comprising:
    first and second tubular sections for containing the grip while receiving the cable into the bore, each section having first and second ends,
    the second tubular section sized for positioning within the first tubular section in a telescopic arrangement so that the sections provide an assembly extendable in length along a longitudinal axis, the first tubular section having an interior dimension, in a radial direction transverse to the longitudinal axis, at least as large as the characteristic external size of the grip,
    the first tubular section including a first stop in the form of an end cap providing a first opening of a first size that permits introducing the cable through the first end and into the first tubular section while the grip is contained in the tool so that movement of the grip out of the first tubular section through the first end is blocked by the end cap; and
    the second tubular section including a second stop positioned in the second tubular section so that, with the grip positioned in the first and second tubular sections and between the first and second stops, when the second tubular section is displaced along the longitudinal axis and toward the first stop a force is transferred against the grip, causing the size of the bore to increase, wherein the end cap comprises a split collar attached to the first tubular section, wherein
    the first opening is sized to block movement of the grip out of the first tubular section through the first end when an end of the grip is adjusted to increase the external size of the grip at an opening to the bore and, while the end cap is attached to the first tubular section:
    the split collar has a selectable configuration that provides a second opening of a second size, larger than the opening of the first size, that permits receipt of the grip there through and into the tool.

9. A tool for adjusting a grip to secure a cable within a bore in the grip surrounded by interlaced wiring, the grip extendable in length along a longitudinal direction so that, as the length of the grip is extended or contracted, the size of the bore is adjusted, in a radial direction transverse to the longitudinal direction, to a relatively large size to receive the cable or to a relatively small size to position the wiring against the cable, the grip having a characteristic external size in the radial direction when the bore is the relatively large size, the tool comprising:
    first and second tubular sections for containing the grip while receiving the cable into the bore, each section having first and second ends,
    the second section sized for positioning within the first section in a telescopic arrangement so that the sections provide an assembly extendable in length along a longitudinal axis, the first section having an interior dimension, in a radial direction transverse to the longitudinal axis, at least as large as the characteristic external size of the grip,
    the first section including a first stop providing an opening that permits introducing the cable through the first end and into the first tubular section while the grip is contained in the tool so that movement of the grip out of the first tubular section through the first end is blocked; and
    the second tubular section including a second stop positioned in the second tubular section so that, with the grip positioned in the first and second tubular sections and between the first and second stops, when the second tubular section is displaced along the longitudinal axis and toward the first stop a force is transferred against the grip, causing the size of the bore to increase, wherein:
    the first stop is a portion of an end cap, attached about the first end of the first section, the end cap comprising portions which form a ring shape wherein and, while the ring shape portions are attached to the first end of the first section:
    (i) each portion is positionable in a first configuration to provide a first opening of a first size suitable for entry of the grip through the first end of the first section, and
    (ii) each portion is positionable in a ring shaped second configuration to provide a second opening size smaller than the first size which permits introducing the cable through the first end and into the first tubular section while movement of the grip out of the first tubular section through the first end of the first section is blocked by the ring-shape portions.

10. The tool of claim 9 wherein:
the first section has a characteristic inside diameter at the opening along the first end thereof; and
the ring-shape portions are each positionable in the first configuration to provide the first opening size for entry of the grip through the first end of the first section equal to the inside diameter of the first section.

11. The tool of claim 9 wherein (i) the grip can be moved out of the first tube section through the first opening while the ring shape portions are attached to the first tubular section and (ii) the cable can be moved through the second opening and into the first tubular section while the ring shaped portions are attached to the first tubular section, with movement of the grip out of the first tubular section through the first end being blocked by the ring-shaped portions.

* * * * *